(12) United States Patent
Takimoto et al.

(10) Patent No.: US 8,814,435 B2
(45) Date of Patent: Aug. 26, 2014

(54) BEARING UNIT

(71) Applicant: JTEKT Corporation, Osaka (JP)

(72) Inventors: Masao Takimoto, Kashiwara (JP);
Ryoichiro Kotani, Kashiwara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/960,278

(22) Filed: Aug. 6, 2013

(65) Prior Publication Data

US 2014/0064647 A1 Mar. 6, 2014

(30) Foreign Application Priority Data

Aug. 28, 2012 (JP) ................................. 2012-187574

(51) Int. Cl.
| | | |
|---|---|---|
| *F16C 13/00* | (2006.01) | |
| *F16C 35/00* | (2006.01) | |
| *F16C 43/04* | (2006.01) | |
| *B60B 27/00* | (2006.01) | |

(52) U.S. Cl.
CPC ......... *B60B 27/0005* (2013.01); *B60B 24/0047* (2013.01); *B60B 2310/316* (2013.01); *B60B 2900/311* (2013.01); *B60B 2310/231* (2013.01); *B60B 27/00* (2013.01)
USPC ............ 384/537; 384/544; 384/584; 384/589

(58) Field of Classification Search
CPC ............................... B60B 27/00; F16C 35/045
USPC .................... 384/537, 544, 584, 589
See application file for complete search history.

(56) References Cited

U.S. PATENT DOCUMENTS

| | | | |
|---|---|---|---|
| 8,007,179 B2 * | 8/2011 | Heim et al. | 384/448 |
| 2002/0006239 A1 * | 1/2002 | Toda et al. | 384/537 |
| 2010/0209034 A1 * | 8/2010 | Masuda et al. | 384/544 |

FOREIGN PATENT DOCUMENTS

| | | |
|---|---|---|
| EP | 1 110 756 A2 | 6/2001 |
| JP | A-2003-094905 | 4/2003 |
| JP | A-2007-232169 | 9/2007 |

OTHER PUBLICATIONS

Dec. 6, 2013 Extended European Search Report issued in European Application No. 13181650.6.

* cited by examiner

*Primary Examiner* — Phillip A Johnson
(74) *Attorney, Agent, or Firm* — Oliff PLC

(57) ABSTRACT

A bearing unit includes an outer ring member having an outer periphery on which a flange portion is formed, the flange portion being fitted to a vehicle body side; an inner ring member that is rotatably inserted in the outer ring member; and rolling elements in double rows, which are rollably arranged between the outer ring member and the inner ring member, wherein bolts are press-fitted in bolt holes formed in a peripheral edge portion of a wheel fitting flange that is formed on an outer periphery of the inner ring member, and a recessed portion is formed in an outer peripheral surface of the wheel fitting flange.

2 Claims, 4 Drawing Sheets

BEARING UNIT

INCORPORATION BY REFERENCE

The disclosure of Japanese Patent Application No. 2012-187574 filed on Aug. 28, 2012 including the specification, drawings and abstract is incorporated herein by reference in its entirety.

BACKGROUND OF THE INVENTION

1. Field of the Invention

The invention relates to a bearing unit, and in particular to a bearing unit in which a wheel fitting flange is formed on an outer periphery of an inner ring member.

2. Description of Related Art

Conventionally, various kinds of bearing units for supporting a wheel of a vehicle with respect to a suspension in a vehicle body so that the wheel is rotatable have been proposed. For example, as shown in FIG. 3, such a bearing unit includes an outer ring member 2, an inner ring member 3 and balls 4. A flange portion 1, which is fitted to a vehicle body side, is formed on an outer periphery of the outer ring member 2. The inner ring member 3 is rotatably inserted in the outer ring member 2. The balls 4 are rolling elements in double rows, which are reliably arranged between the outer ring member 2 and the inner ring member 3. The bearing unit shown in FIG. 3 is a bearing unit for an axle on a drive wheel side of a vehicle. The inner ring member 3 includes a hub spindle 5 and an inner ring component member 6 that is a member separate from the hub spindle 5. The inner ring component member 6 is fitted to an outer periphery of a vehicle inner side end portion (left side end portion in FIG. 3) of the hub spindle 5. A wheel fitting flange 7 for fitting a wheel to the bearing unit is formed on an outer periphery of a vehicle outer side end portion of the hub spindle 5. Bolt holes 8 are formed at predetermined intervals in a peripheral edge portion of the wheel fitting flange 7. A wheel 10 and a brake rotor 11, which are vehicle side component parts, are fitted to fitting bolts 9 that are press-fitted in the bolt holes 8. The wheel 10 and the brake rotor 11 are fastened together by nuts 13.

The brake rotor 11 is combined with a brake system that brakes the rotation of the wheel 10 so as to decelerate the running vehicle. The brake system brakes the rotation of the wheel 10 by pressing brake shoes (not shown), which are secured to the vehicle body side, to the brake rotor 11 so that frictional force is generated. In this case, in order to uniformly generate the frictional force during braking so as to allow the brake system to appropriately exhibit its performance, it is necessary to make clearances between the brake rotor 11 and the brake shoes uniform. For example, if the clearances are not uniform, the frictional force varies during one revolution of the brake rotor 11, and such variation is transmitted in the form of vibration, to the wheel 10 and the vehicle body. As a result, the phenomenon called brake judder occurs.

The braking judder not only causes the occupants to feel discomfort, but also lowers the braking performance and adversely affects the drivability of the vehicle. Thus, in order to suppress the braking judder, it has been demanded to improve the runout accuracy of the brake rotor 11 after the brake rotor 11 is installed in the vehicle.

As a measure for improving the runout accuracy of the brake rotor 11, it may be considered to improve the accuracy of the brake rotor 11 itself. In addition to the above-mentioned measure, there have been measures that are focused on an improvement in flatness of the wheel fitting flange 7 having a surface to which the brake rotor 11 is fitted.

The fitting bolts 9 are fitted in the bolt holes 8 by interference fit, and an interference is set to approximately 0.1 to 0.5 mm (the interference varies depending upon specifications of the bearing unit). Thus, press-fitting of the fitting bolts 9 into the bolt holes 8 may deteriorate the degree of flatness of the surface of the wheel fitting flange 7. Specifically, by press-fitting the fitting bolts 9 in the bolt holes 8, a bulging portion 12 may be formed on a surface 7a of the wheel fitting flange 7 on a side opposite to a surface on which heads 9a of the fitting bolts 9 abut, as exaggeratedly shown in FIG. 4. A bulging height of the bulging portion 12 may reach a value in a range from 25 to 30 μm. As a result, when the brake rotor 11 is fitted, a fitted surface of the brake rotor 11 abuts on the bulging portion 12, and accordingly, the runout accuracy of the brake rotor 11 is lowered. Moreover, as exaggeratedly shown by a long dashed double-short dashed line in FIG. 4, an outer peripheral edge of the wheel fitting flange 7 may be deformed (warped) toward the above-mentioned fitted surface (toward the wheel). In the case where such deformation occurs in the wheel fitting flange 7 as well, since the fitted surface of the brake rotor 11 abuts on a deformed portion 14 that is deformed as described above, when the brake rotor 11 is fitted, the runout accuracy of the brake rotor 11 is lowered.

In order to suppress the lowering of the runout accuracy of the brake rotor 11 caused by the bulging portion 12 and the deformed portion 14 as described above, it has been proposed to remove the bulging portion 12 and the deformed portion 14 by performing a turning process. However, the turning process is laborious, and accordingly, the cost for the tuning process is caused. As a result, the cost for producing the bearing unit is increased. Further, a problem regarding the quality of the bearing unit may be caused due to adhesion of chips or the like.

Thus, a method for preventing deformation of the wheel fitting flange 7 without the necessity of machining the wheel fitting flange 7 after the fitting bolts 9 are press-fitted has been proposed (refer to, for example, Japanese Patent Application Publication 2007-232169 (JP 2007-232169 A)). In a bearing unit described in JP 2007-232169 A, recesses are formed by removing material at positions around bolt holes to a predetermined depth, in the wheel fitting flange. Accordingly, when the fitting bolts are press-fitted in the bolt holes, regions around the bolt holes are elastically deformed toward the recesses. Thus, it is described that the deformation of the wheel fitting flange can be prevented.

However, in the method described in JP 2007-232169 A, as shown in FIG. 1 to FIG. 3 in JP 2007-232169, it is necessary to subject the portions around the bolt holes to a fine cutting process that cannot be easily performed, and further, the cost for the cutting process is high. Moreover, in the method described in JP 2007-232169 A, since the recesses are formed, the strength of the wheel fitting flange is lowered.

SUMMARY OF THE INVENTION

An object of the present invention is to provide a bearing unit in which deformation of a wheel fitting flange is suppressed during press-fitting of bolts, by using simple machining, and at low cost.

According to an aspect of the preset invention, there is provided a bearing unit including: an outer ring member having an outer periphery on which a flange portion is formed, the flange portion being fitted to a vehicle body side; an inner ring member that is rotatably inserted in the outer ring member; and rolling elements in double rows, which are rollably arranged between the outer ring member and the inner ring member, wherein bolts are press-fitted in bolt holes formed in a peripheral edge portion of a wheel fitting flange that is formed on an outer periphery of the inner ring member, and a recessed portion is formed in an outer peripheral surface of the wheel fitting flange.

BRIEF DESCRIPTION OF THE DRAWINGS

The foregoing and further features, and advantages of the invention will become apparent from the following description of example embodiments with reference to the accompanying drawings, wherein like numerals are used to represent like elements and wherein.

DETAILED DESCRIPTION OF EMBODIMENTS

Figure 1:
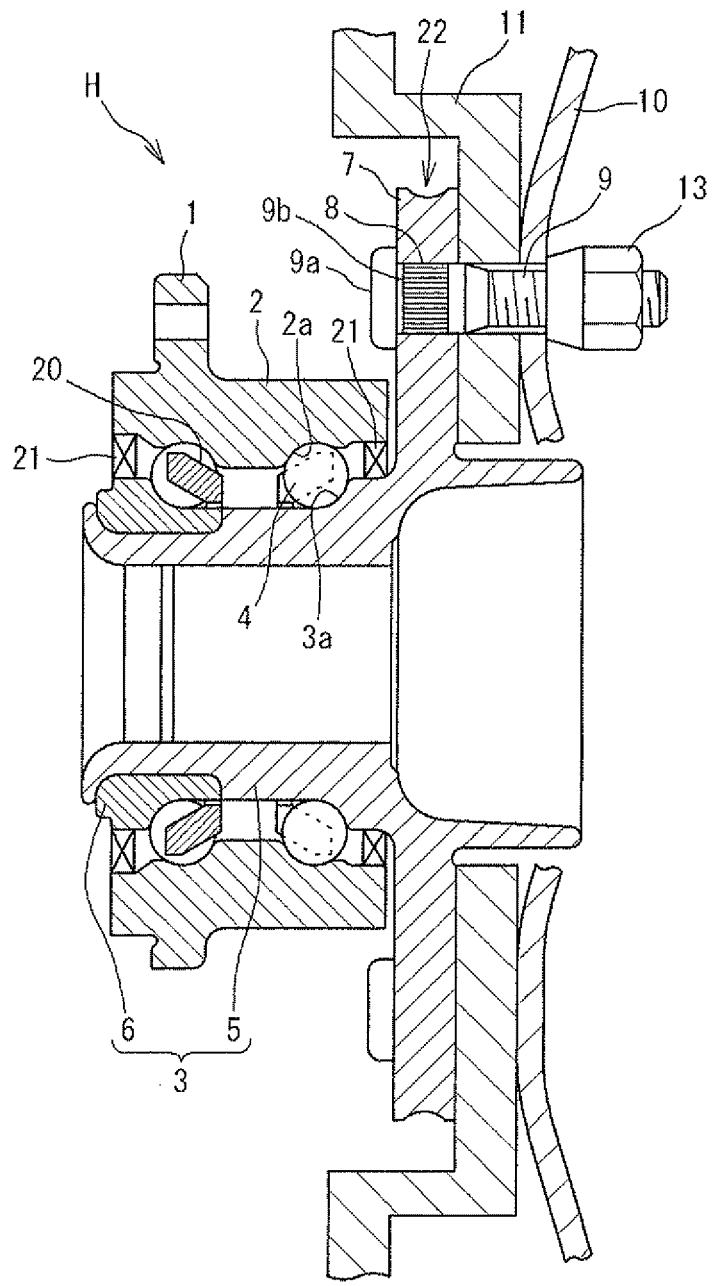
FIG. 1 is a sectional view for illustrating a bearing unit according to an embodiment of the present invention.
Figure 2:
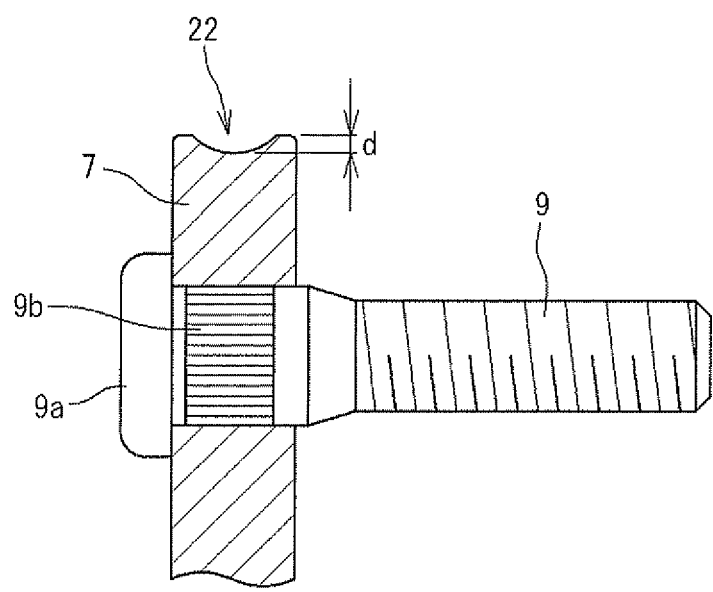
FIG. 2 is a sectional view for illustrating a vicinity of a fitting bolt in the bearing unit shown in FIG. 1.
Figure 3:
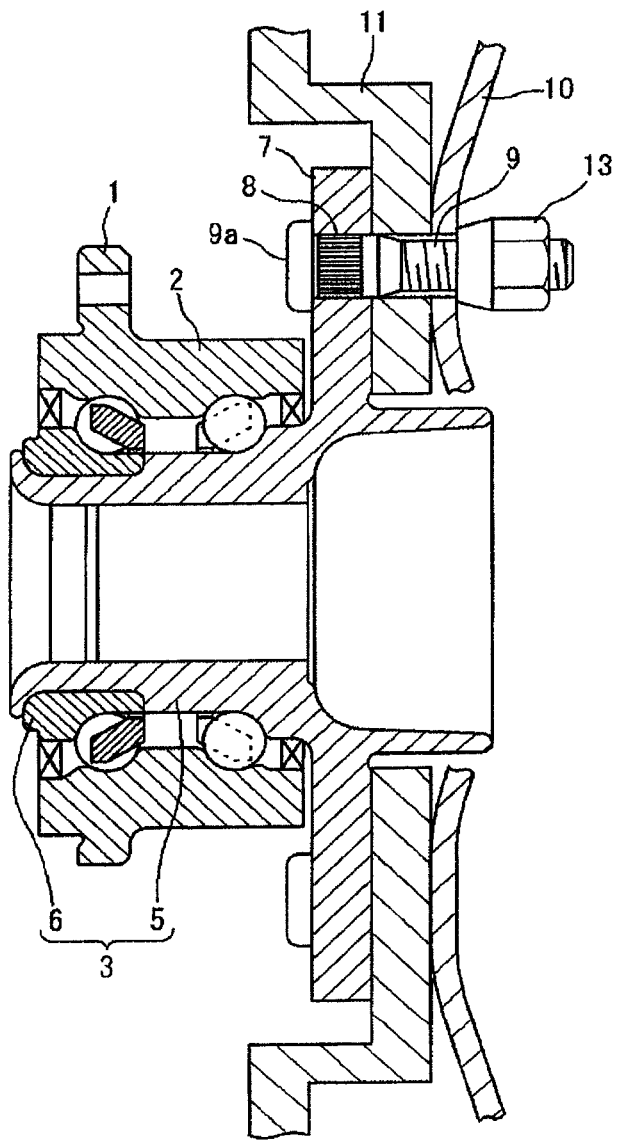
FIG. 3 is a sectional view for illustrating a bearing unit in related art.
Figure 4:
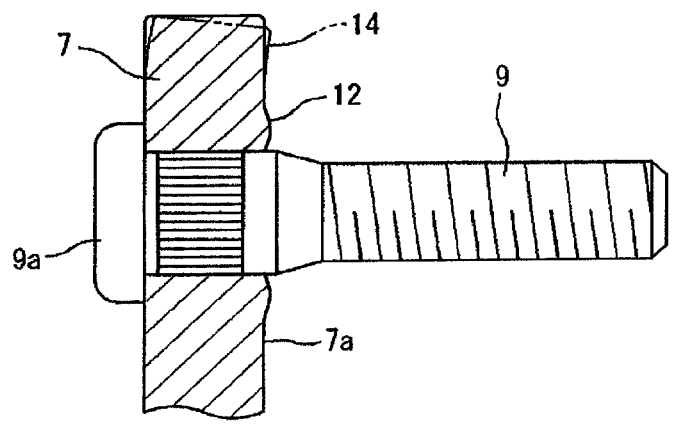
FIG. 4 is a schematic view illustrating a part in which a bolt is press-fitted in the bearing unit in the related art.

Detailed description will be hereinafter made as to a bearing unit according to an embodiment of the present invention with reference to the accompanying drawings. FIG. 1 is a sectional view for illustrating a bearing unit H according to the embodiment of the present invention. FIG. 2 is a sectional view for illustrating a vicinity of a fitting bolt in the bearing unit H shown in FIG. 1. It is to be noted that the bearing unit H shown in FIG. 1 and FIG. 2 has the same basic structure as that of the bearing unit shown in FIG. 3, and accordingly, the same reference numerals are assigned to constitutional elements of the bearing unit H, which are the same as those shown in FIG. 3.

The bearing unit H is a bearing unit for an axle on a drive wheel side in a vehicle. The bearing unit H includes an outer ring member 2, an inner ring member 3 and balls 4. A flange portion 1, which is fitted to a vehicle body side, is formed on an outer periphery of the outer ring member 2. The inner ring member 3 is rotatably inserted in the outer ring member 2. The balls 4 are rolling elements in double rows, which are rollably arranged between the outer ring member 2 and inner ring member 3.

The outer ring member 2 has outer ring raceway surfaces 2a in double rows formed in an inner peripheral surface thereof. The inner ring member 3 has inner ring raceway surfaces 3a that are formed in an outer peripheral surface thereof and opposed to the outer ring raceway surfaces 2a. The balls 4 are arranged between the outer ring raceway surfaces 2a and the inner ring raceway surfaces 3a.

The inner ring member 3 includes a hub spindle 5 and an inner ring component member 6 that is a member separate from the hub spindle 5, and that is fitted to an outer periphery of a vehicle inner side end portion (left side end portion in FIG. 1) of the hub spindle 5. The hub spindle 5 is rotatably supported by the outer ring member 2 through the balls 4 in double rows.

The balls 4 are retained at predetermined circumferential intervals on the inner ring raceway surfaces 3a by a cage 20. Opposite end portions of an annular space defined between the inner ring member 3 and the outer ring member 2 are hermetically sealed by seal members 21.

A wheel fitting flange 7 for fitting a wheel to the bearing unit H is formed on an outer periphery of a vehicle outer side end portion of the hub spindle 5. Bolt holes 8 are formed at predetermined intervals in a peripheral edge portion of the wheel fitting flange 7. A wheel 10 and a brake rotor 11, which are wheel side component parts, are fitted to fitting bolts 9 that are press-fitted in the bolt holes 8. The wheel 10 and the brake rotor 11 are fastened together by nuts 13. Further, each of the fitting bolts 9 has an engagement portion 9b in the vicinity of a head 9a thereof, and the engagement portion 9b is formed so as to have a diameter larger than that of each of the bolt holes 8. Accordingly, when the fitting bolt 9 is press-fitted in the corresponding bolt hole 8, the engagement portion 9b is caught into an inner peripheral surface of this bolt hole 8, and thus, it is possible to prevent the fitting bolt 9 from being rotated together with the corresponding nut 13 when the nut 13 is tightened.

The feature of the present invention is that a recessed portion is formed in an outer peripheral surface of the wheel fitting flange 7. As shown in FIG. 2, the recessed portion may be a circumferential groove 22 whose bottom portion has an arc-shaped section (in a plane containing the rotation axis of the bearing unit H). Further, the recessed portion may be a circumferential groove that has a section in another shape, for example, a circumferential groove that has a rectangular section or V-shaped section. Although a depth d of the circumferential groove 22 is not particularly limited, the depth d may be set to, for example, 1 to 2 mm. The recessed portion may be formed over the entire outer peripheral surface of the wheel fitting flange 7, like the circumferential groove 22 in the embodiment. However, the recessed portion may be formed only in a portion outside each of the bolt holes 8 in a radial direction of the wheel fitting flange 7, in the outer peripheral surface of the wheel fitting flange 7.

Since the recessed portion is formed in the outer peripheral surface of the wheel fitting flange 7 having the peripheral edge portion that has the bolt holes 8 into which the fitting bolts 9 are press-fitted, a portion outside each of the bolt holes 8 can be made thin. Thus, a ridge of material, that is, deformation of the material in a portion around each of the bolt holes 8, which is caused by press-fitting the corresponding fitting bolt 9 in the bolt hole 8 with a predetermined interference (for example, approximately 0.1 to 0.5 mm), can be absorbed by the thin portion. Thus, it is possible to suppress the formation of the above-mentioned bulging portion 12 or occurrence of deformation due to the press-fitting of the bolt. The recessed portion in the outer peripheral surface of the wheel fitting flange 7 can be formed more easily than the recesses in JP 2007-23169 A, and accordingly, the production cost can be reduced.

It is to be noted that the described embodiment is to be considered in all respects only as illustrative and not restrictive. The scope of the present invention should not be limited by the above-mentioned embodiment, and should be defined by the appended claims. All changes that come within the meaning and range of equivalency of the claims are to be embraced within the scope.

For example, although the balls are used as rolling elements in the above-mentioned embodiment, tapered rollers may be used as rolling elements. Further, although the bearing unit is used for the axle on the drive wheel side in the vehicle in the above-mentioned embodiment, the present invention may be applied to a bearing unit for an axle on a driven wheel side.

With the bearing unit according to the present invention, it is possible to suppress deformation of the wheel fitting flange during press-fitting of the fitting bolts, by using simple machining, and at low cost.

What is claimed is:

1. A bearing unit comprising:

an outer ring member having an outer periphery on which a flange portion is formed, the flange portion being fitted to a vehicle body side;

an inner ring member that is rotatably inserted in the outer ring member; and rolling elements in double rows, which are rollably arranged between the outer ring member and the inner ring member, wherein bolts are press-fitted in bolt holes formed in a peripheral edge portion of a wheel fitting flange that is formed on an outer periphery of the inner ring member, and a recessed portion is formed in an outer peripheral surface of the wheel fitting flange, wherein the recessed portion is a circumferential groove having a bottom portion with an arc-shaped section.

2. The bearing unit according to claim 1, wherein the recessed portion is formed only in a portion outside each of the bolt holes in a radial direction of the wheel fitting flange, in the outer peripheral surface of the wheel fitting flange.

* * * * *